United States Patent [19]

Takashima

[11] 4,072,994
[45] Feb. 7, 1978

[54] READ-AFTER-WRITE HEAD

[75] Inventor: Hideo Takashima, Chichibu, Japan

[73] Assignees: Canon Kabushiki Kaisha, Tokyo; Canon Denshi Kabushiki Kaisha, both of Japan

[21] Appl. No.: 643,330

[22] Filed: Dec. 22, 1975

[30] Foreign Application Priority Data

Dec. 28, 1974 Japan .................................. 50-2493
Dec. 28, 1974 Japan .................................. 50-2494

[51] Int. Cl.² ............................................. G11B 5/20
[52] U.S. Cl. ................................................ 360/124
[58] Field of Search ................. 360/124, 123, 53, 121, 360/128; 340/174.1 F; 235/61.11 D; 324/43 R

[56] References Cited

U.S. PATENT DOCUMENTS 2,689,274 9/1954 Saeger .................................. 360/124
3,287,713 11/1966 Porter .................................. 360/124
3,959,824 5/1976 Ohi ...................................... 360/124

Primary Examiner—Robert M. Kilgore
Attorney, Agent, or Firm—Fitzpatrick, Cella, Harper & Scinto

[57] ABSTRACT

There is disclosed a read-after-write head for use in reproducing information immediately after recording, which comprises a recording or writing core and a reproducing or reading core arranged in the head. A dummy core is juxtaposed to the reproducing core, and a winding of some turns is wound on the dummy core in one sense to be connected in series with the winding wound on the reproducing core in another sense. The voltage induced in the reproducing core due to the cross-field is cancelled by the voltage induced in the dummy core, with the result that the cross-field between the recording and reproducing cores is reduced.

33 Claims, 11 Drawing Figures

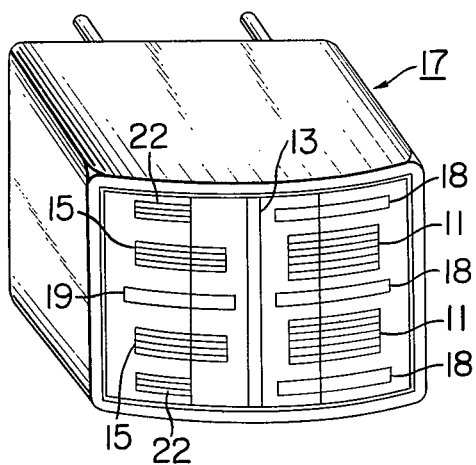
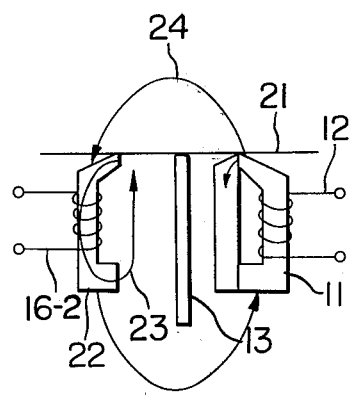
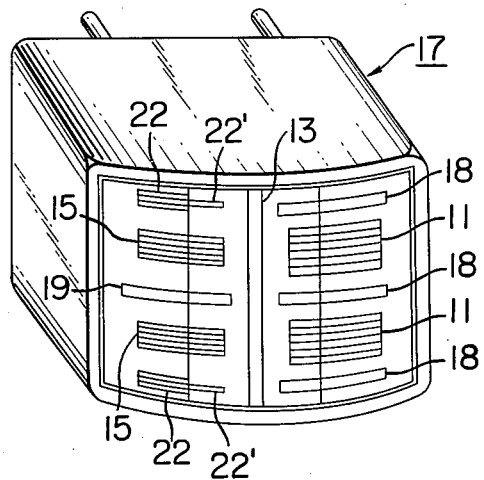
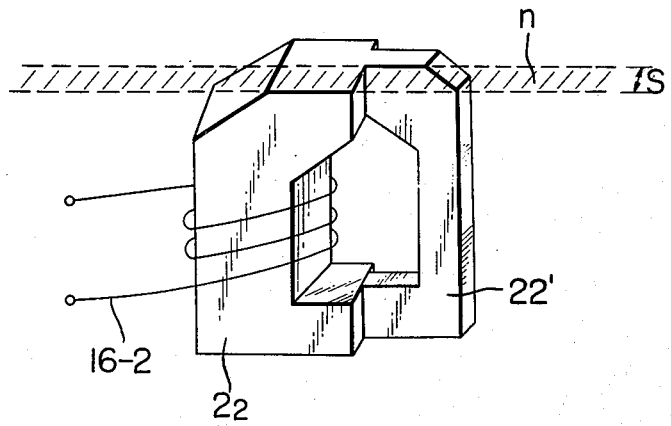

READ-AFTER-WRITE HEAD

BACKGROUND OF THE INVENTION

1. Field of the Invention

This invention relates to a read-after-write head for use in reproducing information immediately after recording, more particularly, a read-after-write head capable of reducing a cross-field from the recording side to the reproducing side.

The read-after-write head has a recording head juxaposed to a reproducing head with a shield plate therebetween, and information written on a recording medium such as a tape or a card is reproduced by the reproducing head by continuously feeding the medium to the reproducing head.

2. Description of the Prior Art

Construction of a conventional read-after-write head will be explained.

FIG. 1 shows a pictorial illustration of a conventional two-track read-after-write head. In the figure, 1 is an outer case of said read-after-write head and 2 is a shield plate in order to reduce any cross-field between recording side 3 and reproducing or reading side 4 at the sliding face of said read-after-write head. The numeral 5 designates recording cores at recording side 3 and the numeral 6 refers to reproducing cores at the reading side 4 while 7 and 8 are shield plates for shielding adjacent tracks.

Generally speaking, these magnetic heads have a tendency such that a reading head is slightly influenced by the cross-field of a writing head as information is read. As shown in FIG. 1, in conventional heads the width of the recording core is greater compared to that of a reading core, and such construction causes considerable cross-field to be generated by the recording head and the reading core 6 detects the cross-field as reproduced noise, which is a serious problem causing poor reproduction quality.

SUMMARY OF THE INVENTION

An object of the invention is to provide a read-after-write head which can reduce the influence of a cross-field upon a reading head from a writing head, thus eliminating a disadvantage of the conventional technique. Precisely speaking, the effective construction of the read-after-write head is of importance in order to reduce the influence of the cross-field.

Another object of the invention is to provide a read-after-write head which protects output-level fluctuation caused by shifting the position of reading from the normal position as the medium is transported from the recording side to the reading side in an embodiment of the read-after-write head which can reduce the influence of the cross-field as described above.

Further objects and features of the invention can be understood from the following description, given with reference to the figures.

BRIEF DESCRIPTION OF THE DRAWINGS

FIG. 2b shows a front elevated view for explanation of the read-after-write head shown in FIG. 2a.

FIG. 7 shows a perspective view of another embodiment of a read-after-write head according to the invention.

FIG. 8 is a schematic drawing to explain the principle of the read-after-write head shown in FIG. 7.

FIG. 9 shows a view of still another embodiment of a read-after-write head according to the invention.

FIG. 10 is an explanatory schematic drawing partially showing an internal construction of the read-after-write head shown in FIG. 9.

DESCRIPTION OF THE PREFERRED EMBODIMENTS

Figure 1:
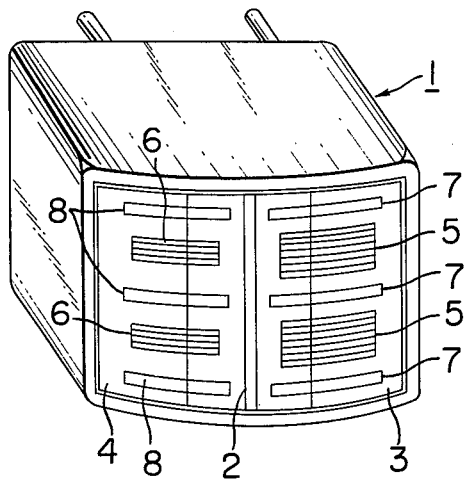
FIG. 1 shows a perspective view of a conventional two-track read-after-write head.
Figure 2A:
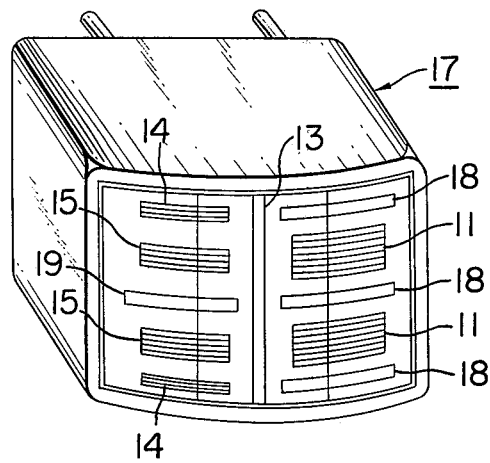
FIG. 2a shows a perspective view of an embodiment of a read-after-write head according to the invention.
Figure 2B:
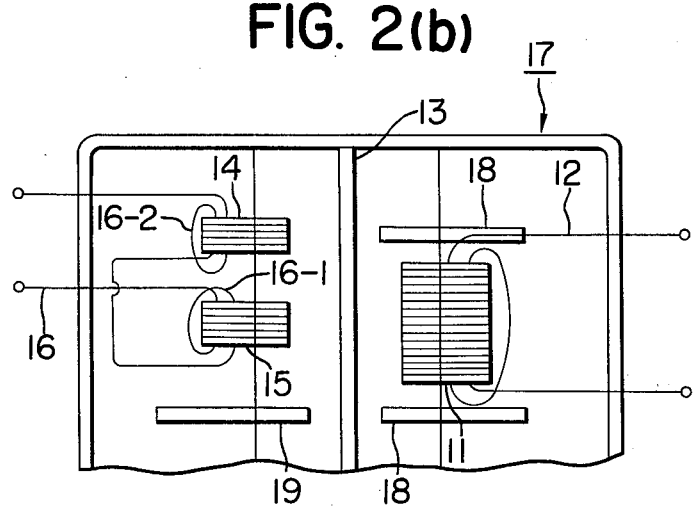

In FIG. 2a and FIG. 2b, recording core 11 is located in the recording side facing one side of a shield plate 13, 12 is a writing input winding wound on the aforementioned core in the recording side, reading core 15 is located in the reading side facing the opposite side of the shield plate 13, 14 is a dummy core located at the reading side, the of which gap is equal to and aligned with that of the aforementioned reading core 15, 16 is an output winding, 17 is a outer case, and 18 and 19 are shield plates to magnetically separate adjacent tracks. The output winding has a winding portion 16-1 wound on reading core 15 and a winding portion 16-2 wound on dummy core 14 and the two winding portions are connected in series but coupled in inverse sense. The advantage of the structure so arranged is such that in FIG. 3 a leakage flux 20 generated by recording core 11 is linked with both dummy core 14 and reading core 15 and the induced voltage in both cores are cancelled due to the inversely sensed connection between the output winding 16 and both cores, thus noise generated by the cross-field of recording core 11 can be reduced. The reduction of the cross-field considerably depends on the turn ratio of the winding on the reading core and of the winding on the dummy core in regard to the distances between the recording core 11, reading core 15 and dummy core 14, and to the shapes and the materials thereof. The relationship between induced voltage Vo over the terminal of output winding 16 and the turn ratio (number of turns of winding portion 16-2 on core 14; number of turns of winding portion 16-1 on core 15) according to FIG. 3 can be obtained.

Figure 3:
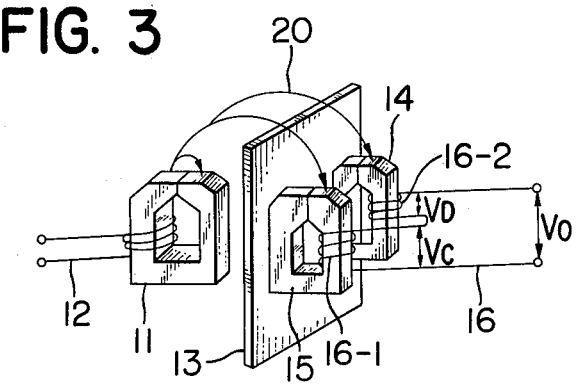
FIG. 3 shows the principle of the invention.

In FIG. 3, the cross-field voltage Vo over the terminal of reading output-voltage winding 16 is $$Vo = Vc - Vd + C$$

Assuming that $Vd/Td = k\, Vc/Tc$
The above equation becomes:

$$Vo = Vc\,(1 - kTd/Tc) + C$$

where $Vc$: induced voltage over winding portion 16-1 of the reading core due to the cross-field generated at recording core 11 by exciting current through writing input winding 12;

$Vd$: induced voltage over dummy winding portion 16-2 due to the cross-field generated at recording core 11 by exciting current through writing input winding 12;

$Tc$: number of turns on the reading core (turns of winding portion 16-1 wound on core 15);

$Td$: number of turns on the dummy core (turns of winding portion 16-2 wound on core 14);

($C$: residual component which can not be cancelled due to phase difference between $Vd$ and $Vc$ etc);

$k$: shunt constant which is determined by the distance from the recording core to the reading core and the dummy core and by the shape of the aforementioned reading core and the aforementioned dummy core. In the embodiment according to the invention, $k$ is about 1.4.

Figure 4:
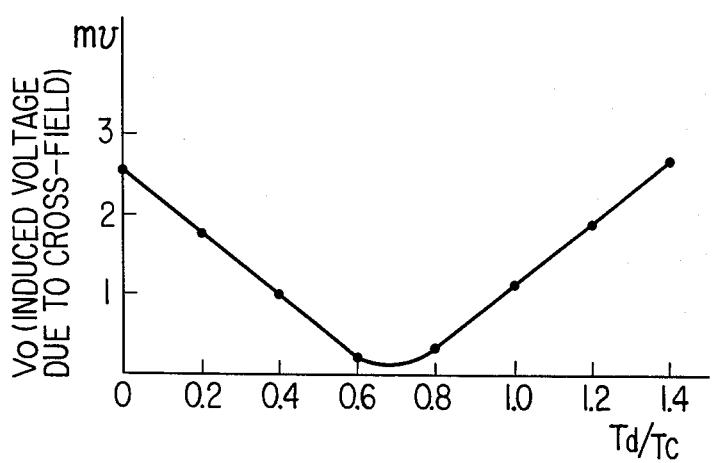
FIG. 4 is chart showing the relationship between induced voltage due to a cross-field and the turn-ratio of a dummy-core winding and read-core winding in an embodiment according to the invention.

$Vo$ and $Td/Tc$ of the equation are measured in an example of the embodiment and are shown in FIG. 4. The induced voltage $Vo$ by the cross-field becomes minimal at about 0.6 to 0.8 of $Td/Tc$.

According to this result, the dummy core is mounted at the reading side with the reading core, and a winding of some turns is wound on each core and the winding portions are connected in series of which the coupled sense is inverted. By this connection, the induced voltage due to the cross-field of the reading core can be cancelled by the induced voltage due to the cross-field of the dummy core, particularly, if $k$ defined in the equation $Vd/Td = k \cdot Vc/Tc$ is about 1.4, the induced voltage due to the crossfield becomes substantially minimum at $Td/Tc$, where the number of turns of dummy core/number of turns of the reading core, = 0.6 to 0.8.

Figure 5:
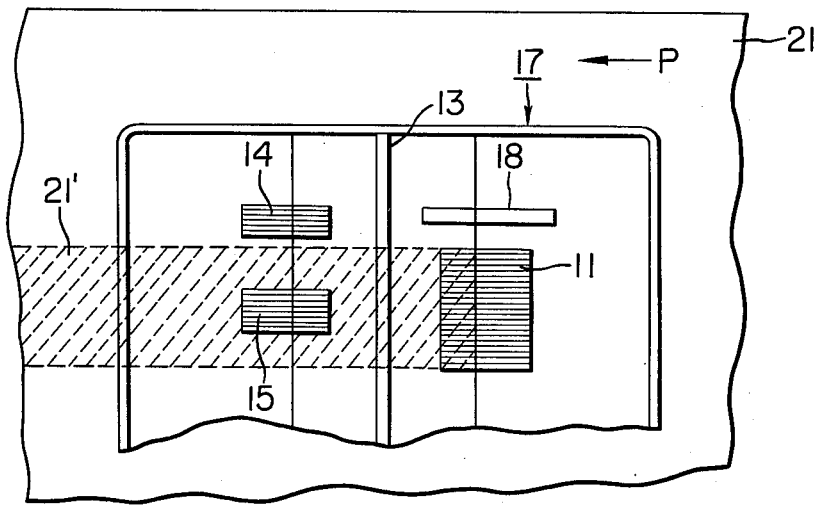
FIGS. 5 and 6 show physical relative positions of a read head and a dummy head against a writing area when the read-after-write head in FIG. 2a is used.
Figure 6:
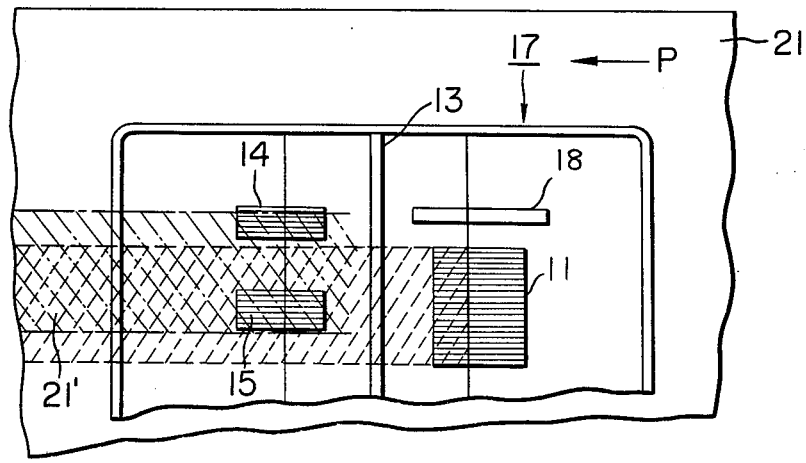

In reading and writing information using the above-mentioned read-after-write head which has the juxaposed reading core and dummy core, the following problem may occur. As shown in FIG. 5, in normal feeding, recording medium 21 is fed in the arrow direction P and information is written in the area just in front of recording core 11 by means of said recording core 11 and a simultaneously written area 21' is produced and the area is running to and over the reading side and only reading core 15 can read out the written information. In this case, the read information benefits from the above-mentioned effect. If the medium runs along the dotted chain line (FIG. 6) due to clearance or other causes, written area 21' covers both dummy core 14 and reading core 15 and the reading voltage due to written area 21' is induced in both the reading core and the dummy core, which results in cancelling the reading voltage in reading core 15, and the output voltage reduces or fluctuates due to the displacement of the medium, which an unfavorable problem in practice.

The invention also provides a solution to prevent reduction or fluctuation of the output voltage and FIG. 7 and FIG. 8 show the embodiment by which the above problem can be solved.

FIG. 7 is a perspective view of a read-after-write head of an embodiment according to the invention. The construction is almost the same as that of FIG. 2 with exception of the substitution of dummy core 14 in FIG. 2(a) by open dummy core 22 which is equal to the dummy core in FIG. 2(a) without one leg. This dummy core without one leg is the heart of the invention, and, if open core 22 is used, reading flux from medium 21 passes through air which has high magnetic reluctance, and the flux coupled with dummy winding portion 16-2 is considerably reduced compared with that from a dummy core which has another leg as a closed loop. This construction also reduces the reproduction efficiency and the level of output voltage induced by winding portion 16-2 of the dummy core becomes very low compared with that of the dummy core with a closed loop. Leakage flux 24 from dummy core 22 passes as indicated by arrows in FIG. 8, which permits, as our final goal, the induction of voltage in the dummy core due to the leakage flux from the recording core.

As described above, according to the invention, the disadvantage that reduces the reading output voltage of the reading core on account of the output voltage of the dummy core can be removed even when the written area in the recording medium covers the whole width of the dummy core, and the induced voltage of the cross-field from the reading side can be also reduced. It is enormously effective in practice.

In FIG. 7, dummy core 22 has only one leg and the phase difference between the induced voltage $Vd$ of dummy core 22 by the cross-field and the induced voltage $Vc$ of reading core 15 by the cross-field may be large. The solution is described in the following embodiment.

FIG. 9 shows a perspective view of still another embodiment of a read-after-write head according to the invention. At the air-gap of dummy core 22 in the read-after-write head in FIG. 7, paired core 22' of which the track width is more narrower than that of said dummy core 22 is mounted, and the other cores are the same as in FIG. 7. FIG. 10 is a view to tridimensionally explain the construction of the aforementioned dummy core 22 and paired core 22', and the width of the track of paired core 22' is obviously narrower than that of dummy core 22 and the shaded part with width S (called n) which is from the extremity of the reading core to the extremity of paired core 22' has no core to read, and, as long as the writing area covers the n part on the sliding surface of dummy core 22, the effect of the read-after-write head in FIG 7 can be expected and also the phase difference between the aforementioned $Vd$ and $Vc$ can be reduced to a minimum on account of paired core 22', and the width S of n can be selected at a suitable position of both paired core 22' and dummy core 22.

What is claimed is:

1. A read-after-write head comprising:
    a recording core provided with an information write-in winding for writing information and consisting of two tracks;
    a reading core provided with an information read-out winding for reading information and consisting of two tracks;
    first shielding means for magnetically separating said recording core and said reading core;
    means provided on the reading core side with respect to said shield means and respectively at the outside of said two tracks of said reading core for eliminating electric potential induced in said reading core by the cross-field from said recording core; and
    a casing for covering said recording core, said reading core, said first shield means and said eliminating means.

2. A read-after-write head according to claim 1, wherein said eliminating means is a dummy core comprising:
    an independent core separate from said reading core; and
    a winding wound on said independent core, said winding being connected in series with said information read-out winding and wound in opposite direction with respect thereto.

3. A read-after-write head according to claim 1, wherein said recording core is provided with a track width larger than that of said reading core.

4. A read-after-write head according to claim 1, further comprising:
   second shield means for magnetically separating two tracks of said recording core; and
   third shield means for magnetically separating two tracks of said reading core.

5. A read-after-write head according to claim 4, wherein said second and third shield means are separated by said first shield means.

6. A read-after-write head comprising:
   a recording core provided with an information write-in winding for writing information;
   a reading core provided with an information readout winding for reading information.
   first shield means for magnetically separating said recording core and said reading core;
   a dummy core provided on the reading side with respect to said first shield means and separated from said recording core; said dummy core being composed of an independent core and a winding connected in series with said information read-out winding and wound in opposite direction with respect thereto, and said dummy and said reading cores being so arranged that the value of $Td/Tc$ is within a range of 0.6 to 0.8 when the shunt constant $k$ defined by an equation $Vd/Td = k \cdot Vc/Tc$ is approximately 1.4, where $Vc$ and $Vd$ respectively represent the induced voltages generated in said reading core and dummy core by the crossfield from said recording core, and $Tc$ and $Td$ respectively represent the number of turns of windings on said reading core and dummy core, thereby maintaining the induced voltage in said reading core by said cross-field at approximately a minimum value; and
   a casing for covering said recording core, said reading core, said first shield means and said dummy core.

7. A read-after-write head according to claim 6, wherein said recording core and said reading core respectively comprise two tracks, and said independent core is provided on the outer sides of said two tracks of said reading head.

8. A read-after-write head according to claim 7, further comprising:
   second shield means for magnetically separating said two tracks of said recording core; and
   third shield means for magnetically separating said two tracks of said reading core.

9. A read-after-write head according to claim 8, wherein said second and third shield means are separated by said first shield means.

10. A read-after-write head according to claim 6, wherein said recording core is provided with a track width larger than that of said reading core.

11. A read-after-write head according to claim 6, wherein said independent core comprises a one-legged core of which one open end only is located at the gap side of said reading core, said open end being aligned with the gap plane of said reading core.

12. A read-after-write head according to claim 11, wherein said one-legged core is provided on the opposite side of said recording core with respect to the gap of said reading core.

13. A read-after-write head comprising:
   a recording core provided with an information write-in winding for writing information;
   a reading core provided with an information read-out winding for reading information;
   first shield means for magnetically separating said recording core and said reading core; and
   a dummy core provided on the reading core side with respect to said first shield means and separated from said reading core; said dummy core being composed of a one-legged core of which one open end only is located at the gap side of said reading core and is aligned with the gap plane of said reading core and a winding on said one-legged core connected in series with said information read-out winding and wound in opposite direction with respect thereto.

14. A read-after-write head according to claim 13, wherein said recording core and said recording core respectively comprise two tracks, and said one-legged core is provided on the outer sides of said two tracks of said reading core.

15. A read-after-write head according to claim 14, further comprising:
   second shield means for magnetically separating said two tracks of said recording core; and
   third shield means for magnetically separating said two tracks of said reading core.

16. A read-after-write head according to claim 15, wherein said second and third shield means are separated by said first shield means.

17. A read-after-write head according to claim 13, wherein said recording core is provided with a track width larger than that of said reading core.

18. A read-after-write head according to claim 13, wherein said dummy and said reading cores are so arranged that the value of $Td/Tc$ is within a range of 0.6 to 0.8 when the shunt constant $k$ defined by an equation $Vd/Td = k \cdot Vc/Tc$ is approximately 1.4, where $Vc$ and $Vd$ respectively represent the induced voltages generated in said reading core and dummy core by the crossfield from said recording core, and $Tc$ and $Td$ respectively represent the number of turns of windings on said reading core and dummy core, thereby maintaining the induced voltage in said reading core by said cross-field at approximately a minimum value.

19. A read-after-write head according to claim 13, wherein said one-legged core is located at the opposite side of said recording core with respect to the gap of said reading core.

20. A read-after-write head according to claim 13, further comprising:
   a casing covering said recording core, said reading core, said first shield means and said dummy core; and
   a juxtaposing core provided with a track width smaller than that of said one-legged core and arranged in a juxtaposed relationship with the open end of said one-legged core to form a gap with said open end.

21. A read-after-write head according to claim 20, wherein said one-legged core is provided on the opposite side of said recording core with respect to the gap plane of said reading core.

22. A read-after-write head comprising:
   a recording core provided with an information write-in winding for writing information;
   a reading core provided with an information read-out winding for reading information;

first shield means for magnetically separating said recording core and said reading core;

a dummy core provided on the reading core side with respect to said first shield means and separated from said reading core; said dummy core being composed of a one-legged core of which one open end only is located at the gap side of said reading core and is aligned with the gap plane of said reading core and a winding on said one-legged core connected in series with said informtion read-out winding and wound in opposite direction with respect thereto, said dummy and said reading cores being so arranged that the value of $Td/Tc$ is within a range of 0.6 to 0.8 when the shunt constant $k$ defined by an equation $Vd/Td = k \cdot Vc/Tc$ is approximately 1.4, where $Vc$ and $Vd$ respectively represent the induced voltages generated in said reading core and dummy core by the cross-field from said recording core, and $Tc$ and $Td$ respectively represent the number of turns of windings on said reading core and dummy core, thereby maintaining the induced voltage in said reading core by said cross-field at approximately a minimum value;

a casing for covering said recording core, said reading core, said first shield means and said dummy core; and a juxtaposing core provided with a track width smaller than that of said one-legged core and arranged in a juxtaposed relationship with said open end of said one-legged core to form a gap with said open end.

23. A read-after-write head according to claim 22, wherein said recording core and said reading core respectively comprise two tracks, and said one-legged core and said juxtaposing core are provided on each outside of two tracks of said reading core.

24. A read-after-write head according to claim 23, further comprising:
second shield means for magnetically separating two tracks of said recording core; and
third shield means for magnetically separating two tracks of said reading core.

25. A read-after-write head according to claim 24, wherein said second and third shield means are separated by said first shield means.

26. A read-after-write head according to claim 22, wherein said recording core being provided with a track width larger than that of said reading core.

27. A read-after-write head according to claim 22, wherein said one-legged core is provided on the opposite side of said recording core with respect to the gap of said reading core.

28. A read-after-write head comprising:
a recording core provided with an information write-in winding for writing information;
a reading core provided with an information read-out winding for reading information;
first shield means for magnetically separating said recording core and said reading core;
a dummy core provided on the reading core side with respect to said first shield means and separated from said reading core; said dummy core being composed of paired cores consisting of a first core and a second core of a track width smaller than that of said first core positioned in a juxtaposed arrangement with juxtaposed faces lying on the gap plane of said reading core and a winding on at least one of said paired cores connected in series with said information read-out winding and wound in opposite direction with respect thereto, said dummy core and said reading core being so arranged that the value of $Td/Tc$ is within a range of 0.6 to 0.8 when the shunt constant $k$ defined by an equation $Vd/Td = k \cdot Vc/Tc$ is approximately 1.4, where $Vc$ and $Vd$ respectively represent the induced voltages generated in said reading core and dummy core by the cross-field from said reading core, and $Tc$ and $Td$ respectively represent the number of turns of windings on said reading core and dummy core, thereby maintaining the induced voltage in said reading core by said cross-field at approximately a minimum value; and said recording and reading cores respectively comprising two tracks, and said pair of first and second cores being provided on each outside of two tracks of said reading core.

29. A read-after-write head according to claim 28, further comprising:
second shield means for magnetically separating two tracks of said recording core; and
third shield means for magnetically separating two tracks of said reading core.

30. A read-after-write head according to claim 29, wherein said second and third shield means are separated by said first shield means.

31. A read-after-write head according to claim 28, wherein said recording core is provided with a track width larger than that of said reading core.

32. A read-after-write head according to claim 28, wherein said first core is located on the opposite side of said recording core with respect to the gap plane of said reading core.

33. A read-after-write head according to claim 32, wherein said winding is wound on said first core.

* * * * *

UNITED STATES PATENT AND TRADEMARK OFFICE
CERTIFICATE OF CORRECTION

PATENT NO. : 4,072,994
DATED : February 7, 1978
INVENTOR(S) : HIDEO TAKASHIMA

It is certified that error appears in the above–identified patent and that said Letters Patent are hereby corrected as shown below:

Column 6, line 18, change "recording" (second occurrence) to -- reading --.

Signed and Sealed this

Eleventh Day of July 1978

[SEAL]

Attest:

RUTH C. MASON
Attesting Officer

DONALD W. BANNER
Commissioner of Patents and Trademarks